United States Patent [19]

Yamamoto et al.

[11] Patent Number: 5,741,577
[45] Date of Patent: Apr. 21, 1998

[54] MAGNETIC RECORDING MEDIUM HAVING A LUBRICANT LAYER WITH A SPECIFIED STRUCTURE OF A SPECIFIED PERFLUOROPOLYETHER LUBRICANT

[75] Inventors: Yuzo Yamamoto; Yoshiyuki Nabata; Shinji Yamada, all of Tochigi, Japan

[73] Assignee: Kao Corporation, Tokyo, Japan

[21] Appl. No.: 555,409

[22] Filed: Nov. 9, 1995

[30] Foreign Application Priority Data

Nov. 10, 1994 [JP] Japan .................. 6-276203
May 25, 1995 [JP] Japan .................. 7-126841

[51] Int. Cl.$^6$ ........................................ G11B 5/71
[52] U.S. Cl. .............. 428/212; 428/336; 428/422; 428/694 TP; 428/694 TF; 428/900
[58] Field of Search ...................... 428/65.4, 336, 428/422, 694 TP, 694 TF, 900, 212

[56] References Cited

U.S. PATENT DOCUMENTS

| | | | |
|---|---|---|---|
| 3,715,378 | 2/1973 | Sianesi et al. | 428/694 TF |
| 4,327,139 | 4/1982 | Schaefer et al. | 428/65 |
| 4,451,646 | 5/1984 | Sianesi et al. | 528/401 |
| 4,657,687 | 4/1987 | Caporiccio et al. | 252/54 |
| 4,960,609 | 10/1990 | Homola et al. | 427/38 |
| 5,049,410 | 9/1991 | Johary et al. | 427/131 |

FOREIGN PATENT DOCUMENTS

| | | |
|---|---|---|
| 0 312 343 | 4/1989 | European Pat. Off. . |
| 0 384 415 | 8/1990 | European Pat. Off. . |
| 0 512 270 | 11/1992 | European Pat. Off. . |
| 0 531 943 | 3/1993 | European Pat. Off. . |
| 38 37 473 | 5/1990 | Germany . |
| 2 091 102 | 7/1982 | United Kingdom . |

*Primary Examiner*—Stevan A. Resan
*Attorney, Agent, or Firm*—Oblon, Spivak, McClelland, Maier & Neustadt, P.C.

[57] ABSTRACT

A magnetic recording medium comprising a substrate having thereon at least a magnetic layer and a lubricant layer and a process for producing the same are disclosed, in which the lubricant layer is an uppermost layer and comprises a perfluoropolyether lubricant having a number average molecular weight of 800 to 30,000 and represented by formula (I):

$$CF_3O-(CF_2O)_m-(CF_2CF_2O)_n-CF_3 \quad (I)$$

wherein m represents an integer of 2 or greater; n represents an integer of 1 or greater; and 7>m/n>2.

5 Claims, 2 Drawing Sheets

MAGNETIC RECORDING MEDIUM HAVING A LUBRICANT LAYER WITH A SPECIFIED STRUCTURE OF A SPECIFIED PERFLUOROPOLYETHER LUBRICANT

FIELD OF THE INVENTION

This invention relates to magnetic recording media and a process for producing the same. More particularly, it relates to a magnetic recording medium useful as a magnetic drum, a magnetic tape and the like, in particular as a hard disk, and a process for producing the same.

BACKGROUND OF THE INVENTION

Magnetic recording media such as magnetic disks generally comprise a substrate having thereon a magnetic layer formed by sputtering, etc. and a protective layer made of carbon, a metal oxide, etc., and a perfluoropolyether liquid lubricant is applied thereon.

A perfluoropolyether liquid lubricant is essential for improving durability of a magnetic recording medium. Conventionally employed perfluoropolyether liquid lubricants include those having main chain skeletons represented by formulae (a) and (b) shown below and having a number average molecular weight of 1,000 to 10,000.

   (a)

   (b)

wherein m and n each represent an integer; m/n is about 1; and o represents an integer.

With the recent increase in recording density, magnetic recording media tend to have reduced surface roughness, which has given rise to the problem that a magnetic head is adsorbed onto the lubricant applied to the magnetic recording medium.

Various proposals have hitherto been made in order to improve durability while preventing adsorption of a magnetic head. For example, JP-A-5-143973 (the term "JP-A" as used herein means an "unexamined published Japanese patent application") proposes introduction of a functional group capable of chemical bonding into the molecules of a lubricant thereby improving durability. JP-A-4-186524 proposes utilization of laser beam-induced surface polymerization to produce directly a fluorine-containing polymer on the surface of a magnetic recording medium, such as a magnetic disk, thereby providing a lubricant layer fixed onto the surface of the disk.

However, these processes, while achieving improvement in adhesion between a magnetic recording medium and a lubricant layer, fail to assure sufficient durability because the lubricant molecules have reduced mobility. The problem of magnetic head adsorption still remains unsolved.

Additional proposals made to date with respect to the formation of a lubricant layer include a process comprising applying an aminoamine compound to an inorganic silicone compound protective layer, further applying thereto a carboxyl-containing fluorocarbon lubricant to cause an acid-base reaction thereby forming a lubricant layer chemically bound to the interface, as disclosed in JP-A-60-101715; a process comprising applying a lubricant having a polar group and a lubricant having no polar group onto the surface to fix firmly the lower lubricant layer to the surface via the lubricant having a polar group thereby assuring long-term durability, as disclosed in JP-A-61-113126, JP-A-61-248218, and JP-A-5-166173; a process in which a terminal functional group of lubricant molecules is covalently bonded to the surface of a substrate to form a stabilized lubricant layer, as disclosed in JP-A-62-114122; a process comprising applying a lubricant to a magnetic recording medium and further applying thereon another lubricant having no affinity to that lubricant, as disclosed in JP-A-1-171101; a technique of forming a lubricant layer comprising a mixture of lubricant molecules having a hydroxyl group at the terminal thereof and non-polar molecules, as disclosed in JP-A-2-73514; a technique of forming a lubricant layer comprising a combination of a lubricant having a polar group at both terminals thereof and a non-polar lubricant, as disclosed in JP-A-3-25720; a process comprising forming a solid lubricant layer by vacuum evaporation and further providing a liquid lubricant layer thereon, as disclosed in JP-A-3-207020; a process in which a lubricant layer comprises a non-polar lubricant and a lubricant having a polar group at a specific mixing ratio, as disclosed in JP-A-4-102224; a process in which a lubricant layer having polarity is formed and another lubricant layer whose affinity is opposite to that lubricant layer is further provided thereon, as disclosed in JP-A-4-286720; a process of forming a lubricant layer comprising a fixed lubricant component and a mobile lubricant component, as disclosed in JP-A-4-311812; and a process in which a carboxyl-containing lubricant layer and an amino-containing lubricant layer are successively formed, as disclosed in JP-A-6-20262.

However, any of the above lubricant layers still cannot be freed of the problem of magnetic head adsorption which arises with decrease in the surface roughness of the magnetic disk.

On the other hand, a process comprising applying a perfluoropolyether lubricant on a protective layer and subjecting the lubricant layer to plasma treatment to fix the lubricant layer to the protective layer has been proposed as disclosed in JP-A-5-174354. Further, a process comprising surface polymerizing a fluorine-containing gas on the surface of a protective layer thereby fixing the terminal of the lubricant molecules to the surface of a protective layer has also been proposed as described in JP-A-3-104015, JP-A-4-311812, and JP-A-6-220185.

The former process still involves instability of the anti-adsorption properties. The latter process (surface polymerization process) makes use of photo-oxidation polymerization, which typifies commercial processes for synthesizing perfluoropolyether, by which lubricant molecules are fixed to the surface of a protective layer. That is, a fluorine-containing gas, e.g., hexafluoropropene, and oxygen are introduced to the surface of a protective layer while directly irradiating the protective layer with a laser beam to induce photo-oxidation polymerization (surface polymerization) only on the surface of a disk. In order for surface polymerization to proceed, a special manipulation should be taken. For example, a disk is cooled to −30° to −70° C. to condense the raw material gas. Besides, because polymerization takes place on the surface, the following problems arise.

(1) Since the surface of a protective layer is considerably non-uniform as microscopically observed, fluctuations of the surface energy, existence of fine projections and depressions, localization of chemically active sites, and the like cause fluctuations of adsorption and condensation of the raw material gas. It follows that the polymerization reaction proceeds non-uniformly as microscopically observed. Therefore, it is difficult to form a homogeneous lubricant layer having a uniform thickness, resulting in the failure of obtaining stable durability.

(2) The magnetic layer or protective layer may undergo variation or deterioration of characteristics on direct irradiation with an intense laser beam.

(3) Laser beam irradiation to induce surface polymerization must be carried out for each disk, which is unsuitable for mass production.

(4) The surface of the protective layer must be pretreated for acceleration of fixing of a lubricant layer, such as oxidation, etching, light or electromagnetic wave irradiation, which makes the process complicated and costly.

(5) A disk must be cooled to a very low temperature (−30° C. or lower). Taking the reaction efficiency into consideration, this is not practical from the viewpoint of suitability to mass production and cost incurred.

(6) Large-sized equipment is required for rapidly cooling quantities of disks.

(7) If the temperature of a disk cooled to a very low temperature is raised to room temperature in a short time, moisture condensation occurs at the fine uneven parts on the surface due to capillary action. Therefore, the temperature should be raised, taking an extended period of time. This leads to reduction in production efficiency.

In addition, the rotational speed of a working magnetic disk has been increasing, and the floatation height of a magnetic head has been decreasing so as to meet the demand for high-density recording. Accordingly, the demands for abrasion resistance, non-adsorptivity, and durability have ever been increasing.

SUMMARY OF THE INVENTION

An object of the present invention is to provide a magnetic recording medium having a lubricant layer which has a good non-adsorptivity against a magnetic head and is excellent in durability and environmental stability even where the magnetic recording medium has extremely small surface unevenness for realizing a reduced floatation height of a magnetic head in order to cope with high-density recording.

Another object of the present invention is to provide a process for producing a magnetic recording medium having the above-described characteristics with ease and stable productivity, which process is suited to mass production.

The present invention provides a magnetic recording medium comprising a substrate having thereon at least a magnetic layer and a lubricant layer as an uppermost layer, wherein the lubricant layer comprises a perfluoropolyether lubricant having a number average molecular weight of 800 to 30,000 and represented by formula (I):

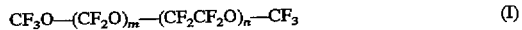

$$CF_3O-(CF_2O)_m-(CF_2CF_2O)_n-CF_3 \quad (I)$$

wherein m represents an integer of 2 or greater; n represents an integer of 1 or greater; and 7>m/n>2.

The present invention also provides a process for producing a magnetic recording medium comprising forming on a substrate at least a magnetic layer and a lubricant layer in this order, in which the lubricant layer is provided by forming a layer comprising fixed lubricant molecules and a layer comprising free lubricant molecules, both synthesized by vapor phase polymerization, the fixed lubricant molecules being fixed to the surface of an underlying layer, while the free lubricant molecules not being fixed to the surface of an underlaying layer.

Figure 1:
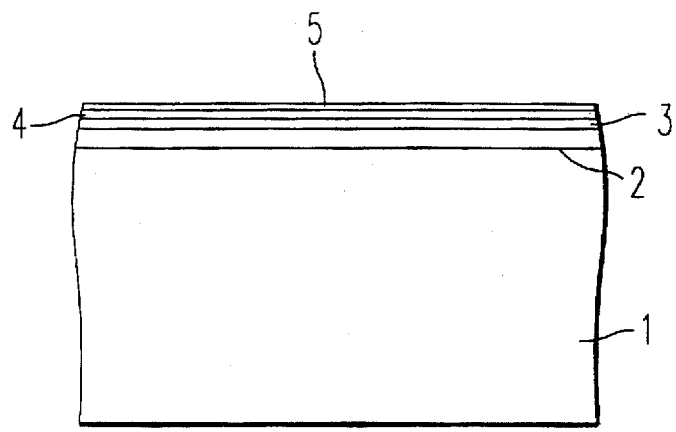
FIG. 1 is a schematic cross section of a magnetic recording medium according to the present invention.

The reference numerals used in these figures means as follows.

1: Carbon substrate
2: Undercoat layer
3: Magnetic layer
4: Protective layer
5: Mixed lubricant layer
6: Vacuum chamber
7: Laser transmitting windows
8: Inlets for introducing a raw material gas
9: Exhaust vent
10: Magnetic recording media
11: Rack

DETAILED DESCRIPTION OF THE INVENTION

The substrate which can be used in the present invention may be either magnetic or non-magnetic. Non-magnetic substrates are generally used.

Non-magnetic substrates include those made of carbon, such as glass-like carbon, tempered glass, crystallized glass, aluminum or aluminum alloys, titanium or titanium alloys, ceramics, resins, and composite materials composed of these materials. Glass-like carbon is particularly preferred for its excellent heat resistance and lightness.

If desired, the substrate may be subjected to texture treatment. Texture treatment can be carried out by various methods for providing surface unevenness, such as polishing with a polishing tape or a sand grindstone, etching with an acid, thermal oxidation, anodizing, precipitation of a silicate compound on the surface by spin coating, plasma ashing, and sputtering of a metal (sputtering texture treatment).

On a substrate is provided a magnetic layer, such as a magnetic film deposited by physical vapor deposition (PVD). Materials forming a magnetic layer of this type include Co-based magnetic alloys mainly comprising Co, such as CoCr, CoNi, CoCrX, CoNiX, and CoWX, wherein X represents at least one element selected from Ta, Pt, Au, Ti, V, Cr, Ni, W, La, Ce, Pr, Nd, Pm, Sm, Eu, Li, Si, B, Ca, As, Y, Zr, Nb, Mo, Ru, Rh, Ag, Sb, Hf, etc.

While not limiting, a preferred thickness of the magnetic layer is from about 20 to 50 nm.

If desired, an undercoat layer may be provided between a magnetic layer and a substrate. The undercoat layer can be formed, e.g., of Cr, Ti, Al or an alloy thereof by PVD, e.g., sputtering. While not limiting, a preferred thickness of the undercoat layer is form 10 to 100 nm.

The lubricant layer according to the present invention may be provided directly on a magnetic layer but is preferably formed on a protective layer provided on a magnetic layer. It is a generally followed practice to provide a protective layer on a metallic thin film type magnetic layer. The protective layer is formed by, for example, PVD or spin coating and is preferably made of material of high mechanical strength, such as an oxide of metals, e.g., Al, Si, T, Cr, Zr, Nb, Mo, Ta or W (e.g., silicon oxide or zirconium oxide), a nitride of these metals, a carbide of these metals (e.g., silicon carbide or tungsten carbide), carbon (e.g., diamond-like carbon), and boron nitride. Additionally, the materials described in JP-A-5-217154, JP-A-5-217156, JP-A-5-

225555, JP-A-5-225557, JP-A-5-282661, JP-A-6-25840, JP-A-6-119631, JP-A-6-203367 and JP-A-6-251359 are also useful. Among them, preferred are carbon, silicon carbide, boron carbide, tungsten carbide, silicon oxide, zirconium oxide, silicon nitride, boron nitride, and a composite thereof. Carbon, especially diamond-like carbon and glass-like carbon, are particularly preferred. While not limiting, a preferred thickness of the protective layer is from 5 to 25 nm.

The lubricant layer according to the present invention is composed of a layer comprising fixed lubricant molecules which are fixed onto the surface of an underlying layer (e.g., a protective layer) (hereinafter sometimes referred to as a fixed layer) and a layer comprising free lubricant molecules which are not fixed onto the underlaying layer (hereinafter sometimes referred to as a free layer).

The term "fixed" as used herein means that lubricant molecules are firmly fixed either chemically or physically to an underlaying layer, such as a protective layer. A fixed layer as referred to in the present invention is such a layer that would not washed away when washed with a fluorocarbon solvent, such as Freon 113. On the other hand, a free layer as referred to herein means such a layer that is washed away on washing with the above-mentioned fluorocarbon solvent.

A free layer to fixed layer ratio in terms of thickness or weight preferably ranges from 1/10 to 10/1, still preferably from 2/5 to 5/1.

From the standpoint of abrasion resistance and durability, the fixed layer preferably has a thickness of 5 to 30 Å.

From the viewpoint of durability and low coefficient of friction, the free layer preferably has a thickness of 2 to 80 Å.

The total thickness of the lubricant layer composed of the fixed layer and the free layer is preferably 2 to 200 Å, still preferably 10 to 100 Å, particularly preferably 20 to 80 Å. The most preferred thickness is 20 to 50 Å. Within the preferred thickness range, spacing loss is minimized, and satisfactory lubricating effects are exerted.

The process for producing the magnetic recording medium of the present invention will be described below by referring to preferred embodiments thereof.

Figure 2:
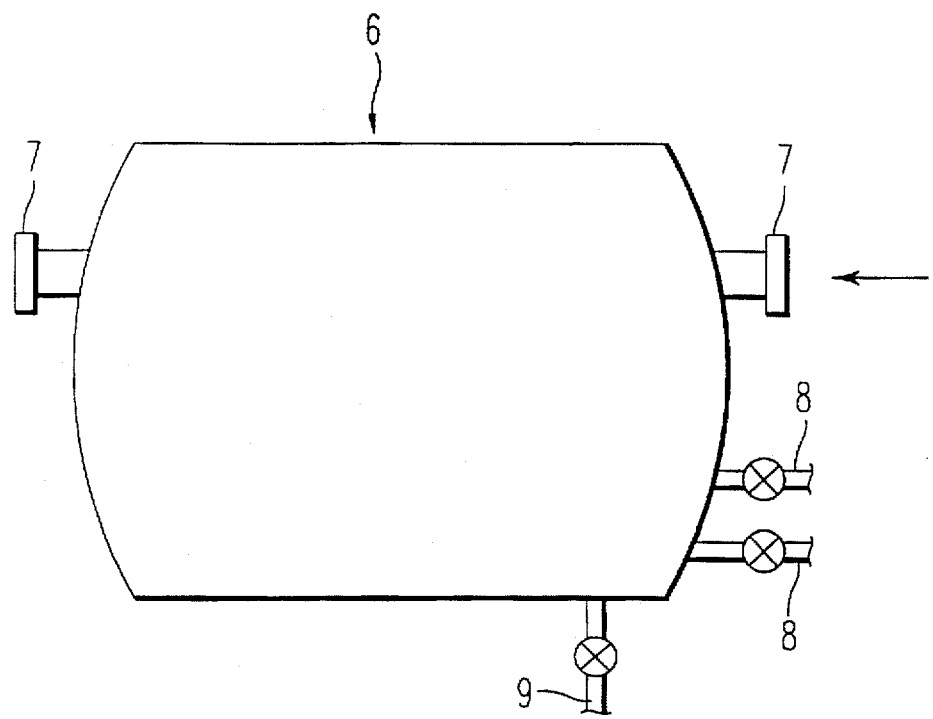
FIG. 2 is a schematic view illustrating an embodiment of a vacuum chamber which can be used for the synthesis of a lubricant.
Figure 3:
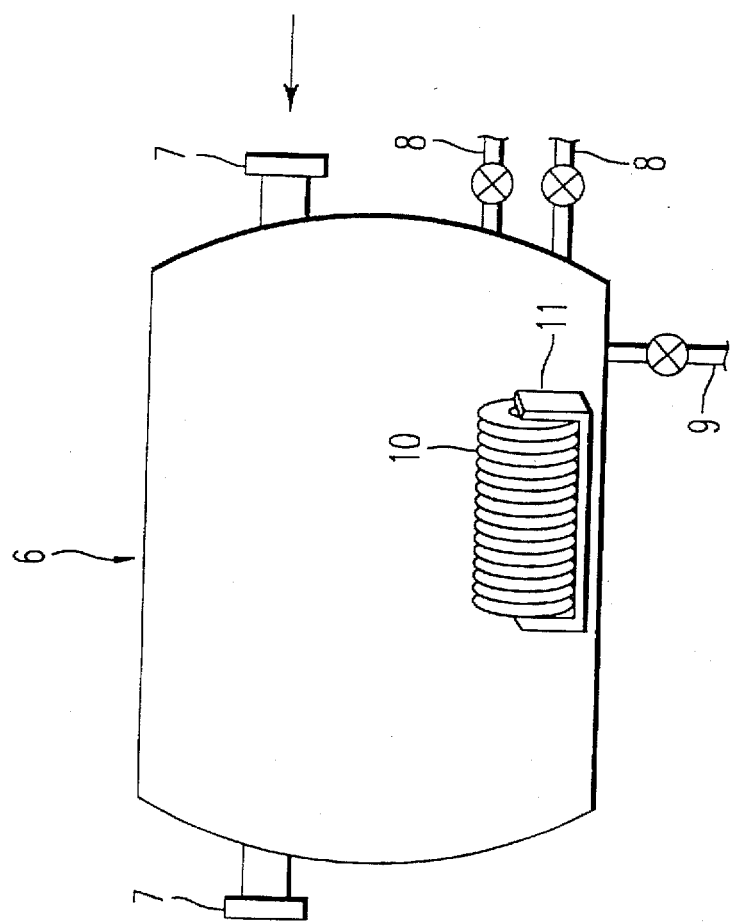
FIG. 3 is a schematic view illustrating another embodiment of a vacuum chamber which can be used for the synthesis of a lubricant.

In a preferred embodiment of the present invention, a lubricant layer is formed by applying a lubricant synthesized by vapor phase polymerization in vacuo to, for example, a protective layer. Synthesis of the lubricant and formation of a lubricant layer from the synthesized lubricant will be explained with reference to the accompanying drawings. FIGS. 2 and 3 each schematically illustrate a vacuum chamber to be used for synthesis of the lubricant.

First, synthesis of the lubricant and formation of a lubricant layer from the synthesized lubricant using the vacuum chamber as shown in FIG. 2 is explained.

Vacuum chamber 6 shown in FIG. 2 is preferably used for synthesis of the lubricant of the present invention. A polymerizable fluorocarbon compound and oxygen are introduced into vacuum chamber 6 and allowed to polymerize in a vapor phase in vacuo. The terminology "vapor phase polymerization" as used herein is a polymerization technique in which the above-described fluorocarbon compound and oxygen are retained in a gaseous state, and a polymerization reaction occurs only in the gas phase. Applicable polymerization techniques include plasma polymerization and chemical vapor deposition (CVD), such as photo assisted CVD. Photo assisted CVD, which can be carried out with simple equipment, is recommended.

Light sources to be used in photo assisted CVD include ultraviolet (UV) light and infrared (IR) light. Reaction induced by an IR laser using IR rays as a light source is basically an oscillation-excited reaction, which is essentially the same as a thermal reaction. Therefore, cases are sometimes met with, where side reactions take place to produce products other than a desired one, making it difficult to control the structure of a lubricant layer. To the contrary, a UV layer using UV rays as a light source is to induce a polymerization reaction through electron excitement. It has good reaction selectivity and involves little participation of a thermal reaction so that the probability of any side reaction's occurring is low. Thus, it is desirable to use UV light as a light source for photo assisted CVD. An excimer laser having an oscillation wavelength of 193 nm may be mentioned as a preferred example.

The fluorocarbon compounds which can be used in the vapor phase polymerization include, for example, the compounds described in JP-A-6-276203. Also useful are compounds represented by formulae (II) to (IV):

$$CF_2=CFR_f^1 \qquad (II)$$

wherein $R_f^1$ represents a fluorine atom, a perfluoroalkyl group, a perfluoroalkenyl group, a partially fluorinated alkyl group, a partially fluorinated alkenyl group, a perfluoroaryl group, or a partially fluorinated aryl group.

$$CF_2=C(R_f^2)(R_f^3) \qquad (III)$$

wherein $R_f^2$ and $R_f^3$, which may be the same or different, each represents a hydrogen atom, a fluorine atom, a perfluoroalkyl group, a perfluoroalkenyl group, a partially fluorinated alkyl group, a partially fluorinated alkenyl group, a perfluoroaryl group, or a partially fluorinated aryl group.

$$CF_2=CFO(R_f^4) \qquad (IV)$$

wherein $R_f^4$ represents a fluorine atom, a perfluoroalkyl group, a perfluoroalkenyl group, a partially fluorinated alkyl group, a partially fluorinated alkenyl group, a perfluoroaryl group, a partially fluorinated aryl group, or a perfluoroalkoxyalkyl group.

Specific examples of the fluorocarbon compounds represented by formulae (II) to (IV) are difluoroethylene, trifluoroethylene, tetrafluoroethylene, trifluoropropene, tetrafluoropropene, pentafluoropropene, hexafluoropropene, trifluorobutene, tetrafluorobutene, pentafluorobutene, hexafluorobutene, trifluoropentene, tetrafluoropentene, pentafluoropentene, hexafluoropentene, perfluoro-1-pentene, monofluorobutadiene, difluorobutadiene, trifluorobutadiene, tetrafluorobutadiene, pentafluorobutadiene, and hexafluorobutadiene, with tetrafluoroethylene and hexafuoropropene being preferred. These fluorocarbon compounds may be used either individually or as a combination of two or more thereof.

The fluorocarbon compound and oxygen are preferably used at a fluorocarbon/oxygen molar ratio of 1/0.5 to 1/100, still preferably 1/1 to 1/10, particularly preferably 1/2 to 1/8. Within these preferred ranges, laser light can be efficiently absorbed in the vapor phase polymerization system, a lubricant having a sufficient amount of ether bonds can be obtained, and a lubricant having satisfactory durability can be obtained.

The above-mentioned photo assisted CVD can be performed using the vacuum chamber shown in FIG. 2 as follows. Vacuum chamber 6 has a pair of laser transmitting windows 7 provided at the upper part of each side wall, valued inlets 8 for introducing a raw material gas, and valved exhaust vent 9 for evacuation of the chamber and release of the chamber to the atmosphere.

In carrying out vapor phase polymerization, exhaust vent 9 is connected to a vacuum pump (not shown) to evacuate chamber 6 to, for example, a degree of vacuum of $1\times10^{-5}$ to 1 Torr. The above-described fluorocarbon compound and oxygen are introduced into the chamber to the respective prescribed partial pressure. Laser light, e.g., excimer laser light, is transmitted in the direction indicated by the arrow.

The gas pressure in vacuum chamber 6 during vapor phase polymerization is preferably 5 to 200 Torr.

The raw material gas, i.e., a fluorocarbon compound and oxygen, can be carried by a carrier gas, such as Ar, He, $N_2$, $H_2$, etc. The carrier gas can be used in an amount varying from an equal molar amount to several hundred times the molar quantity of the raw material gas. It is usually introduced to a gas pressure of 1 to 2,000 Torr.

The inner temperature of the vacuum chamber is preferably 10° to 90° C. during the vapor phase polymerization.

On completion of the polymerization, vacuum chamber 6 is cooled to recover the produced lubricant, while discharging unreacted matter and low-molecular weight products through exhaust vent 9. The cooling is carried out by using a coolant, such as liquid nitrogen, preferably to a temperature of 0° to −50° C. Instead of cooling with a coolant, the lubricant may be condensed by means of a condensation part utilizing a capillary phenomenon, which may be provided within vacuum chamber 6. For example, narrow gaps, such as slits at 400 μm intervals or a honeycomb or porous structure having a cell diameter of 400 μm, may be used as a condensation part.

The lubricant thus obtained is liquid at room temperature. The lubricant is then applied to the protective layer of a magnetic recording medium to form a lubricant layer composed of a fixed layer and a free layer. While not limiting, the lubricant can be applied by a thin film formation technique, such as spin coating or dip coating. The ratio of a fixed layer and a free layer to be formed can be controlled by proper selection of the amount of adsorbed moisture on the magnetic recording medium, coating conditions, and the like.

Synthesis of a lubricant and formation of a lubricant layer by use of the vacuum chamber shown in FIG. 3 are explained below. While not particularly described, as for the parts common to FIGS. 2 and 3, the techniques as used in the embodiment shown in FIG. 2 apply to the embodiment shown in FIG. 3. The reference numerals used in FIG. 2 are used for the same members in FIG. 3.

Vacuum chamber 6 shown in FIG. 3 is a preferred container for synthesizing the lubricant of the present invention. Magnetic recording media 10 having a protective layer are held upright or laid horizontally in vacuum chamber 6 by means of rack 11.

A lubricant is synthesized by vapor phase polymerization of the above-described fluorocarbon compound and oxygen in vacuo in vacuum chamber 6 and deposited on the surface of the upright or lying magnetic recording media to form a lubricant layer. That is, lubricant molecules (perfluoropolyether) synthesized in a gas phase reach the surface of the magnetic recording medium through diffusion and adhere thereto to form a lubricant layer. Since the film formation proceeds in a gas phase, it is not influenced by the non-uniformity of the surface of the disk. Since there is no need of cooling the disk for acceleration of surface condensation, the process has high productivity.

The film formation by the use of vacuum chamber 6 shown in FIG. 3 is preferably carried out through two steps: a first step in which a fluorocarbon compound and oxygen are vapor phase polymerized in vacuo to form a lubricant layer and, after steam is introduced into the chamber, a second step in which a fluorocarbon compound and oxygen are vapor phase polymerized again in vacuo to form a lubricant layer. The first polymerization step is predominantly for formation of a fixed layer, while the second polymerization step is predominantly for formation of a free layer. In other words, a free layer may be formed in the first polymerization step, and likewise a fixed layer may be formed in the second step.

In the first polymerization step, exhaust vent 9 is connected to a vacuum pump (not shown), and vacuum chamber 6 is once evacuated to a degree, e.g., of $1\times10^{-5}$ to 1 Torr. The above-described fluorocarbon compound and oxygen are then introduced into the chamber to a prescribed gas pressure (preferably 5 to 200 Torr). A laser beam, e.g., an excimer laser beam, is transmitted through the upper part of vacuum chamber 6 and above magnetic recording media 10 in the direction shown by the arrow in such a manner that the beam does not strike against magnetic recording media 10.

It is desirable for magnetic recording media 10 to be rotated in their circumferential direction by means of rack 11 during the vapor phase polymerization so that the lubricant layer may be formed uniformly over the entire surface of the disks.

The first step polymerization may be repeated several times.

After completion of the first polymerization step, exhaust vent 9 is opened to let air in, especially humid air (preferably air having a relative humidity of 30 to 90%, still preferably 40 to 80%). Then vacuum chamber is evacuated in the same manner as in the first step, and the fluorocarbon compound and oxygen are introduced to the same gas pressure as in the first step and irradiated with an excimer laser beam, etc. in the same manner as in the first step.

The second step polymerization may be repeated several times.

After the second polymerization step, the first polymerization step may be performed again.

The fluorocarbon compounds used in the first and second steps may be the same or different but are preferably the same.

The magnetic recording medium is preferably maintained at 10° to 90° C., still preferably about 15° to 50° C. throughout the first and second steps. A desired lubricant layer is hardly obtained outside this substrate temperature.

The lubricant synthesized by the use of the vacuum chambers shown in FIGS. 2 and 3 is mostly perfluoropolyether having a number average molecular weight of 800 to 30,000 and represented by formula (I):

$$CF_3O-(CF_2O)_m-(CF_2CF_2O)_n-CF_3 \qquad (I)$$

wherein m represents an integer of 2 or greater; n represents an integer of 1 or greater; and 7>m/n>2.

The structure of the perfluoropolyether lubricant, in which the $-(CF_2O)_m-$ skeleton constitutes the main portion and the m/n ratio is within the above range, produces such effects that the mobility of the lubricant molecules is improved, and the interaction between the lubricant molecules and the functional groups on the surface of an underlying layer (i.e., a protective layer or a magnetic layer) is improved. In particular, where the atmosphere containing moisture is fed into the system in the formation of a lubricant layer, an interaction takes place between the lubricant and the adsorbed water on the surface of the underlying layer. That is, the lubricant having the above-described structure possesses both moderate mobility and moderate bonding force to the surface of the underlying layer.

The m/n ratio in formula (I) is greater than 2 and smaller than 7. If the m/n is 7 or more, the lubricant is tribochemically instable. If it is 2 or less, the interaction with water and the molecular mobility are reduced. A preferred m/n ratio is 2.1 to 6.9, still preferably 3 to 6.

The number average molecular weight of the perfluoropolyether is 800 to 30,000. If the number average molecular weight of the perfluoropolyether lubricant is less than 800, the durability of the lubricant layer is reduced. If it exceeds 30,000, the lubricant layer has an increased coefficient of friction due to the increased viscosity. A preferred number average molecular weight of the perfluoropolyether lubricant is 900 to 29,000, still preferably 1,000 to 10,000.

The m/n ratio in formula (I) can be adjusted by controlling the composition of the raw material gas to be polymerized. The molecular weight can be adjusted by controlling the amount of the raw material gas fed. Further, the thickness of the lubricant layer, especially the lubricant layer comprising free lubricant molecules, can be adjusted by controlling the conditions of vapor phase polymerization (e.g., raw material gas pressure, and irradiation conditions and time) and the number of the times of repetition of the polymerization step.

The lubricant layer, which mainly comprises the perfluoropolyether of formula (I), may further contain other structural units as far as the effects of the present invention are not impaired.

With respect to the steps other than the formation of a lubricant layer, known techniques for producing magnetic recording media can be applied without particular restriction.

When compared with a conventional magnetic disk such as one having a mixed lubricant layer which comprises a lubricant having a polar group and a lubricant having no polar group and is formed by coating, the magnetic disk of the present invention, having a mixed lubricant layer which comprises fixed lubricant molecules and free lubricant molecules and is formed by vapor phase polymerization, has markedly superior characteristics as proved by a higher and more stable level exhibited in a CSS test.

The present invention will now be illustrated in greater detail with reference to Examples, but it should be understood that the present invention is not construed as being limited thereto. Unless otherwise indicated, all the ratios of mixed gas are given by weight.

EXAMPLE 1

A substrate of 1.8 inch in diameter and 25 mil in thickness which was made of glass-like carbon (GC) having a density of 1.5 g/cm$^3$ was polished to a center-line average roughness Ra of 10 Å. The substrate was subjected to texture treatment (sputtering of an Al—Si alloy) by means of a DC magnetron sputtering system under an argon gas pressure of 3 mTorr at a substrate temperature of 260° C. to adjust the Ra to 15 Å.

Chromium was deposited on the textured substrate by DC magnetron sputtering under conditions of an argon gas pressure of 10 mTorr, a substrate temperature of 180° C., and a bias voltage of −200 V to form undercoat layer 2 having a thickness of 5 nm. Under the same conditions, 40-nm thick magnetic layer 3 comprising CoCrPtB was formed on undercoat layer 2.

A facing target sputtering system in which a glass-like carbon-made target was placed was evacuated, and argon gas was introduced thereinto to a gas pressure of 2 mTorr to conduct sputtering to form 200-Å thick protective layer 4 comprising glass-like carbon on magnetic layer 3. The resulting magnetic disk is hereinafter called a green disk.

Separately, vacuum chamber 6 for photo reaction (photo assisted CVD system) shown in FIG. 2 was evacuated to $5\times10^{-2}$ Torr, and 20 Torr of hexafluoropropene (C$_3$FCF=CF$_2$) and 100 Torr of oxygen were fed thereto. The raw material gas was irradiated with a laser beam emitted from an ArF excimer laser (wavelength: 193 nm) and having passed through air by 1 m. The pulse energy of the laser beam had a power of 150 mJ (at the inlet of the vacuum chamber), the pulse frequency was 2 Hz, and the number of times of irradiation was 10,000 pulses. Vacuum chamber 6 was cooled, the lubricant produced was collected and, at the same time, the unreacted raw material gas and low-molecular weight products were discharged out of the system through exhaust vent 9. As a result of FT-IR and $^{13}$F-NMR analyses, the lubricant produced was identified to be perfluoropolyether mainly comprising the following structure wherein m/n was 2.2 and having a number average molecular weight of 1,100.

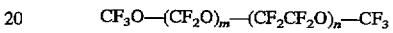

$$CF_3O-(CF_2O)_m-(CF_2CF_2O)_n-CF_3$$

The lubricant was also found to contain a repeating unit having a double bond as a trace component.

The resulting lubricant was diluted with a diluent solution (PF 5080, produced by 3M Co.), and the solution was applied to protective layer 4 of the above-prepared green disk by dip coating to form 18-Å thick lubricant layer 5 comprising a fixed layer and a free layer. There was thus obtained a magnetic disk comprising a substrate having thereon a texture layer, an undercoat layer, a magnetic layer, a protective layer, and a lubricant layer in this order. The lubricant layer comprised a fixed layer having a thickness of 16 Å which was fixed on the protective layer and a free layer having a thickness of 2 Å which was formed on the fixed layer.

The structure of the lubricant layer composed of a fixed layer and a free layer was confirmed by a weight loss on ultrasonic cleaning with Freon 113 for 10 minutes, and existence of residual lubricant molecules after the ultrasonic cleaning was confirmed by ESCA analysis (ESCALAB 200C produced by VG Science Co., AlKα rays).

EXAMPLES 2 TO 9

Magnetic disks were obtained in the same manner as in Example 1, except for using the lubricants shown in Table 1 below.

EXAMPLES 10 TO 12

Magnetic disks were obtained in the same manner as in Example 2, except for using the lubricant and the substrate shown in Table 2 below.

Comparative Examples 1 to 4

Magnetic disks were obtained in the same manner as in Example 1, except that the green disk having a varied glide height (GH) as shown in Table 2 below was coated with a commercially available lubricant L-7 shown in Table 1 to a varied coating thickness as shown in Table 2.

Comparative Examples 5 to 7

Magnetic disks were obtained in the same manner as in Example 1, except for using commercially available lubricants L-8 to L-10 shown in Table 1 below.

The lubricants used in the foregoing Examples and Comparative Examples are shown in Table 1 below.

TABLE 1

| Lubricant | m/n | Number Average Molecular Weight | Terminal Group |
|---|---|---|---|
| L-1 | 2.2 | 1100 | trifluoromethyl |
| L-2 | 2.1 | 2300 | trifluoromethyl |
| L-3 | 2.4 | 4400 | trifluoromethyl |
| L-4 | 2.1 | 3000 | trifluoromethyl |
| L-5 | 3.5 | 3100 | trifluoromethyl |
| L-6 | 6.8 | 2900 | trifluoromethyl |
| L-7 | 1.1 | 4500 | trifluoromethyl |
| L-8 | 1.1 | 1000 | hydroxyl |
| L-9 | 1.0 | 2000 | hydroxyl |
| L-10 | 0.9 | 4000 | hydroxyl |

CSS Test

Each of the magnetic disks obtained in the foregoing Examples and Comparative Examples was given 20,000 cycles of 5 seconds' running at intervals of 5 seconds' stop at 4500 rpm using a thin film head produced by Yamaha Corporation (head load: 3.5 g; floatation height: 2.8 μinch). The static friction coefficient was measured immediately thereafter and after 24 hours' standing. The results obtained are shown in Table 2.

standing becomes more appreciable with the increasing thickness of the free layer. On the other hand, as can be seen from the results of Comparative Examples 5 to 7, magnetic recording media using commercially available perfluoropolyether lubricants having a functional group at the terminal thereof are still inferior in lubricating properties.

The magnetic recording media of the present invention in which a specific substance is used as a lubricant layer thus proved to have a low coefficient of friction and excellent durability.

EXAMPLE 13

A substrate of 1.8 inch in diameter and 25 mil in thickness which was made of glass-like carbon (GC) having a density of 1.5 g/cm$^3$ was polished to a center-line average roughness Ra of 10 Å. The substrate was subjected to texture treatment (sputtering of an Al—Si alloy) to adjust the Ra to 15 Å.

Chromium was deposited on the substrate by DC magnetron sputtering in an argon gas atmosphere to form 50-nm thick undercoat layer 2, and then CoCrTa magnetic layer 3 having a thickness of 40 nm was formed on undercoat layer 2. A facing target sputtering system in which a glass-like carbon target was placed was evacuated, and argon gas was

TABLE 2

| Example No. | Lubricant | Fixed Layer Thickness (Å) | Free Layer Thickness (Å) | Static Friction Coefficient Initial | Static Friction Coefficient After Standing | GH (μm) | Substrate |
|---|---|---|---|---|---|---|---|
| Example 1 | L-1 | 16 | 2 | 0.45 | 0.72 | 1.5 | GC |
| Example 2 | L-2 | 17 | 1 | 0.42 | 0.68 | 1.5 | GC |
| Example 3 | L-3 | 20 | 3 | 0.48 | 0.77 | 1.5 | GC |
| Example 4 | L-2 | 17 | 18 | 0.44 | 0.70 | 1.5 | GC |
| Example 5 | L-2 | 18 | 30 | 0.42 | 0.72 | 1.5 | GC |
| Example 6 | L-2 | 17 | 59 | 0.39 | 0.75 | 1.5 | GC |
| Example 7 | L-4 | 17 | 5 | 0.44 | 0.70 | 1.5 | GC |
| Example 8 | L-5 | 18 | 4 | 0.42 | 0.68 | 1.5 | GC |
| Example 9 | L-6 | 20 | 7 | 0.45 | 0.71 | 1.5 | GC |
| Example 10 | L-2 | 17 | 10 | 0.57 | 0.86 | 1.5 | Al |
| Example 11 | L-2 | 16 | 7 | 0.51 | 0.78 | 1.5 | tempered glass |
| Example 12 | L-2 | 18 | 8 | 0.55 | 0.82 | 1.5 | crystallized glass |
| Comparative Example 1 | L-7 | 3 | 10 | 0.91 | 1.42 | 2.0 | GC |
| Comparative Example 2 | L-7 | 2 | 9 | 1.12 | 1.68 | 1.8 | GC |
| Comparative Example 3 | L-7 | 3 | 9 | 1.33 | 2.81 | 1.5 | GC |
| Comparative Example 4 | L-7 | 3 | 14 | 0.86 | 3.23 | 1.5 | GC |
| Comparative Example 5 | L-8 | 6 | 9 | 1.15 | 1.93 | 1.5 | GC |
| Comparative Example 6 | L-9 | 6 | 10 | 0.98 | 1.51 | 1.5 | GC |
| Comparative Example 7 | L-10 | 7 | 11 | 0.92 | 1.60 | 1.5 | GC |

As is apparent from the results in Table 2, the magnetic recording media of Examples 1 to 12 retain a low level of static friction coefficient even if the thickness of the free layer is increased. To the contrary, the comparative magnetic recording media of Comparative Examples 1 to 4 using a commercially available perfluoropolyether lubricant having an m/n ratio of 2 or less and having no functional group are inferior in durability and, in particular, suffer from a marked increase in static friction coefficient after standing. The durability is improved by increasing the thickness of the free layer, but the increase of the static friction coefficient after introduced thereinto to a partial pressure of 2 mTorr to conduct sputtering to form 200-Å thick protective layer 4 made of glass-like carbon.

The thus obtained green disks 10 were put upright at certain intervals in vacuum chamber 6 as shown in FIG. 3, and vacuum chamber 6 was evacuated to 5×10$^{-2}$ Torr. Hexafluoropropene and oxygen were fed to the vacuum chamber to a partial pressure of 10 Torr and 60 Torr, respectively. The raw material gas was irradiated with 1500 pulses of a laser beam (power: 150 mJ; pulse frequency: 2

Hz) emitted from an ArF excimer laser (wavelength: 193 nm) over 12 minutes, while rotating the disks on their axis.

To the vacuum chamber was fed 100 torr of air (humidity: 60%). The chamber was again evacuated to $1\times10^{-2}$ Torr, and 10 Torr of hexafluoropropene and 60 Torr of oxygen were fed and irradiated with 1500 pulses of the same laser beam as used above for 12 minutes.

In the above-described photo assisted CVD, the laser beam was emitted in the direction indicated by the arrow so as not to irradiate the green disks directly, and the green disks were kept at room temperature (22° C.).

There were thus obtained magnetic disks comprising a substrate having thereon a texture layer, an undercoat layer, a magnetic layer, a protective layer, and a lubricant layer in this order, in which the lubricant layer was a mixed layer composed of fixed lubricant molecules part of which were fixed to the surface of the protective layer and free lubricant molecules which were not fixed on the surface of the protective layer.

In Table 3 below are shown the raw material and reaction conditions used in the formation of the lubricant layer. The number average molecular weight and the m/n ratio in formula (I) of the lubricant molecules are also shown.

The mixed structure of the lubricant layer composed of fixed molecules and free molecules was confirmed by a weight loss on ultrasonic cleaning with a fluorocarbon solvent for 10 minutes and existence of residual lubricant molecules after the ultrasonic cleaning was confirmed by ESCA analysis (ESCALAB 200C produced by VG Science Co., AlKα rays). The results of the ESCA analysis revealed a peak in the range of from 294.8 to 250 eV assigned to C1s, which agreed with the C1s spectrum of the $(CF_2-O)_n$ unit of the $-(CF_2O)_n-(CF_2O)_m-$ moiety of a commercially available lubricant. Accordingly, the lubricant layer is believed to have a structural unit of $-(CF_2O)_n-$. Since the spectral intensity ratio of C1s, F1s and O1s, which seems assigned to $-CF_2O-$, was 1.0:5.21:2.86, there is a possibility that structural units other than $-(CF_2O)_n-$ also existed.

EXAMPLES 14 TO 28

Magnetic disks were obtained in the same manner as in Example 13, except for changing the conditions of photo assisted CVD as shown in Table 3.

Each time the CVD step was repeated, 100 Torr of air (humidity: 60%) was introduced into vacuum chamber 6, the chamber was evacuated, and reactive gas was introduced.

The raw material gas and the reaction condition in the synthesis of the lubricant layer are shown in Table 3. The number average molecular weight (Mn) and the m/n ratio in formula (I) of the formed lubricant molecules are also shown in Table 3.

TABLE 3

| Example No. | Raw Material Gas | X/O$_2$ Molar Ratio | Gas Pressure (Torr) | Temperature (°C.) | Air Humidity (%) | Number of CVD Steps | Number of Laser beam Pulses | Substrate | m/n | Mn |
|---|---|---|---|---|---|---|---|---|---|---|
| 13 | X$_1$ + O$_2$ | 10/60 | 70 | 22 | 60 | 2 | 3000 | C | 2.8 | 1400 |
| 14 | X$_1$ + O$_2$ | 10/60 | 70 | 22 | 60 | 3 | 4500 | C | 1.5 | 2100 |
| 15 | X$_1$ + O$_2$ | 10/60 | 70 | 22 | 60 | 4 | 6000 | C | 2.1 | 3500 |
| 16 | X$_1$ + O$_2$ | 10/60 | 70 | 22 | 60 | 8 | 12000 | C | 2.4 | 6000 |
| 17 | X$_1$ + O$_2$ | 10/60 | 70 | 22 | 45 | 8 | 12000 | C | 1.3 | 11000 |
| 18 | X$_1$ + O$_2$ | 10/60 | 70 | 22 | 67 | 8 | 12000 | C | 1.4 | 3400 |
| 19 | X$_1$ + O$_2$ | 10/60 | 70 | 30 | 60 | 4 | 6000 | C | 1.6 | 2800 |
| 20 | X$_1$ + O$_2$ | 10/60 | 70 | 22 | 60 | 4 | 6000 | G1 | 2.1 | 2300 |
| 21 | X$_1$ + O$_2$ | 10/60 | 70 | 22 | 60 | 4 | 6000 | G2 | 2.1 | 2300 |
| 22 | X$_1$ + O$_2$ | 10/60 | 70 | 22 | 60 | 4 | 6000 | NiP/Al | 2.1 | 2300 |
| 23 | X$_1$ + O$_2$ | 10/60 | 70 | 22 | 60 | 4 | 6000 | Ti | 2.1 | 2300 |
| 24 | X$_2$ + O$_2$ | 10/60 | 70 | 22 | 60 | 4 | 6000 | C | 2.8 | 2000 |
| 25 | X$_2$ + O$_2$* | 25/75 | 100 | 22 | 60 | 4 | 6000 | C | 2.0 | 1100 |
| 26 | X$_3$ + O$_2$ | 10/60 | 70 | 22 | 60 | 4 | 6000 | C | 3.5 | 3100 |
| 27 | X$_4$ + O$_2$ | 10/60 | 70 | 22 | 60 | 4 | 6000 | C | 6.8 | 2900 |
| 28 | X$_5$ + O$_2$ | 10/60 | 70 | 22 | 60 | 4 | 6000 | C | 1.1 | 4500 |

Note:
X$_1$: Hexafluoropropene
X$_2$: 1,1,1,3,3-Pentafluoropropene
X$_3$: Tetrafluoroethylene
X$_4$: Hexafluoro-1,3-butadiene
X$_5$: Hexafluoropropylene + tetrafluoroethylene (1:1)
O$_2$*: O$_2$ + Ar (1:1)
C: Carbon
G1: Tempered glass
G2: Crystallized glass

Comparative Example 8

On an aluminum substrate plated with Ni—P were formed a texture layer, an undercoat layer, a magnetic layer, and a protective layer in the same manner as in Example 13 to prepare a green disk. The green disk was placed in a vacuum chamber of a photo resisted CVD system, the chamber evacuated, a mixed gas of hexafluoropropene and oxygen (1:1) fed to a partial pressure of 100 Torr, and the green disk directly irradiated with a laser beam (power: 150 mJ; pulse frequency: 2 Hz) of an ArF excimer laser (wavelength: 193 nm) to form a lubricant layer.

Comparative Example 9

On an aluminum substrate plated with Ni—P were formed a texture layer, an undercoat layer, a magnetic layer, and a protective layer in the same manner as in Example 13 to prepare a green disk. The green disk was placed in a vacuum chamber of a photo assisted CVD system, and the chamber was cooled to −50° C. while evacuating. A mixed gas of $CF_2CF=CF_2$ and oxygen (3:1) and 1 Torr of $CF_3OCF_3$ were fed to the chamber, and the green disk was directly irradiated with a laser beam (power: 300 mJ; pulse frequency: 0.7 Hz) emitted from a carbonic acid gas laser (1.06μ band; 971.9 cm$^{-1}$) for 12 minutes to form a lubricant layer.

Comparative Example 10

On an aluminum substrate plated with Ni—P were formed a texture layer, an undercoat layer, a magnetic layer, and a protective layer in the same manner as in Example 13 to prepare a green disk. The green disk was dipped in a solution of a perfluoropolyether lubricant (Fomblin AM2001 produced by Monte Cassino Corp.), taken out of the bath, and laid down in a box type chamber equipped with a low-pressure mercury lamp (150 W). After evacuating the chamber, 10 Torr of hexafluoroethane and 10 Torr of fluorine were fed, and 3 Torr of perfluoropropene was further fed to the chamber. The raw material gas was irradiated with a laser beam (power: 150 mJ; pulse frequency: 2 Hz) emitted from an ArF excimer laser (wavelength: 193 nm) and condensed through a quartz lens for 5 minutes to induce dielectric breakdown for radical treatment. During the radical treatment, the low-pressure mercury lamp was turned on to light directly the green disk.

Comparative Example 11

The green magnetic disk prepared in Example 13 was coated with a solution of a perfluoropolyether lubricant having an active group (Demnum SP, produced by Daikin Industries, Ltd.) by dip coating, and the coated layer was baked at 150° C. for 30 minutes. After cooling, the coated layer was subjected to ultrasonic cleaning with a fluorocarbon solvent for 10 minutes. Thereafter, a solution of a chemically-inactive perfluoropolyether lubricant (Demnum S-100, produced by Daikin Industries, Ltd.) was further applied thereto by dip coating.

Comparative Example 12

On an aluminum substrate plated with Ni—P were formed a texture layer, an undercoat layer, a magnetic layer, and a protective layer in the same manner as in Example 13 to prepare a green disk. The green disk was set in a chamber of a photo assisted CVD system. After evacuation, 5 Torr of tetrafluoromethane was introduced into the chamber, and the green disk was directly irradiated with a laser beam of a carbonic acid infrared laser condensed through a lens to form a lubricant layer.

Evaluation

Each of the magnetic disks obtained in Examples 13 to 28 and Comparative Examples 8 to 12 was examined in terms of thickness of the lubricant layer and the weight ratio of free lubricant molecules to fixed lubricant molecules in the lubricant layer. The results obtained are shown in Table 4 below.

Further, the magnetic disks were tested according to the following test methods. The test results are also shown in Table 4.

1) CSS Test

A CSS test was carried out by conducting 20,000 cycles of 5 seconds' running at 4500 rpm and 5 seconds' stop using a thin film head produced by Yamaha Corporation (head load: 3.5 g; floatation height: 2.8 inch) and an increase in the static friction coefficient after 20,000 cycles was measured.

2) GH Test

A glide height test was carried out using MG 150T manufactured by PROQUIP Co. and a 50% slider head. At a floatation height of 1.2 μinch, a rate of pass of 90% or higher was graded "S", 50 to 90% "A", 30 to 50% "B", and 30% or less "C".

TABLE 4

| Example No. | Lubricant Layer Thickness (Å) | Free Lubricant Mols./Fixed Lubricant Mols. | CSS Characteristics | GH Characteristics |
|---|---|---|---|---|
| Example 13 | 29 | 9/20 | 0.50 | S |
| Example 14 | 38 | 18/20 | 0.45 | S |
| Example 15 | 55 | 35/20 | 0.33 | S |
| Example 16 | 78 | 58/20 | 0.26 | S |
| Example 17 | 22 | 3/19 | 0.80 | S |
| Example 18 | 85 | 64/21 | 0.26 | S |
| Example 19 | 49 | 30/19 | 0.27 | S |
| Example 20 | 53 | 33/20 | 0.35 | A |
| Example 21 | 54 | 35/19 | 0.35 | A |
| Example 22 | 57 | 37/20 | 0.36 | A |
| Example 23 | 55 | 35/20 | 0.33 | A |
| Example 24 | 58 | 38/20 | 0.37 | S |
| Example 25 | 58 | 38/20 | 0.41 | S |
| Example 26 | 45 | 27/18 | 0.42 | S |
| Example 27 | 48 | 29/19 | 0.40 | S |
| Example 28 | 53 | 33/20 | 0.51 | S |
| Comparative Example 8 | 17 | 0/17 | 1.7 | C |
| Comparative Example 9 | 35 | 0/35 | 1.5 | C |
| Comparative Example 10 | — | 1/46 | 2.7 | C |
| Comparative Example 11 | 18 | 7/11 | 2.1 | A |
| Comparative Example 12 | — | 0/15 | 3.1 | C |

It is seen from Table 4 that the magnetic disks according to the present invention satisfy such a very strict GH requirement as small as 1.2 μinch and also exhibit superior results in the CSS test. In other words, the present invention makes it possible to minimize the spacing loss (the distance between a magnetic head and a magnetic layer) while providing a magnetic disk excellent in durability as well as electromagnetic conversion characteristics.

To the contrary, the magnetic disk of Comparative Example 11, in which the lubricant layer is composed of fixed molecules and free molecules but is formed by dip coating, has poor CSS characteristics. The one obtained in Comparative Example 9, in which the lubricant layer is formed by photo assisted CVD on a cooled green disk, shows unevenness in its lubricant layer and has poor GH characteristics. The one obtained in Comparative Example 8, in which the lubricant layer is formed by surface polymerization induced by direct irradiation on a green disk, suffers unevenness in its lubricant layer and has poor GH characteristics.

The one of Comparative Example 10, in which the lubricant layer is formed by once applying a lubricant by coating and subjecting the coating layer to plasma treatment and UV irradiation, fails to exert sufficient CSS characteristics when the green disk has a fine textured surface (small surface roughness) as aimed in the present invention.

Further, the one of Comparative Example 12, in which the protective layer is treated with a fluorine radical, also has poor CSS characteristics.

It is thus proved that the present invention provides a magnetic recording medium in which a mixed lubricant layer formed by vapor phase polymerization exhibits markedly stable and high CSS durability and suitability to an extremely small glide height. The present invention is particularly advantageous in that a magnetic recording medium even with small surface roughness sufficiently satisfies CSS requirements.

Additionally, the present invention makes it possible to produce a magnetic recording medium having the above-mentioned characteristics in quantity with stable productivity and ease.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a substrate having thereon at least a magnetic layer and a lubricant layer, wherein said lubricant layer is an outermost layer and comprises a perfluoropolyether lubricant having a number average molecular weight of 800–30,000 and represented by formula (I):

$$CF_3O-(CF_2O)_m-(CF_2CF_2O)_n-CF_3 \quad (I)$$

wherein m represents an integer of 2 or greater; n represents an integer of 1 or greater; and 7>m/n>2, and wherein said lubricant layer is composed of a layer comprising fixed lubricant molecules and a layer comprising free lubricant molecules, both synthesized by vapor phase polymerization, said fixed lubricant molecules being fixed to the surface of an underlying layer adjacent said lubricant layer, while said free lubricant molecules not being fixed to the surface of the underlaying layer, and wherein a carbon protective layer is present on said magnetic layer, and the lubricant layer is provided on said carbon protective layer.

2. The magnetic recording medium according to claim 1, wherein said lubricant layer has a thickness of 2 to 200 Å, and a ratio of said free lubricant molecules and said fixed lubricant molecules in said lubricant layer is 1/10 to 10/1 by weight.

3. The magnetic recording medium according to claim 1, wherein said lubricant molecules have a structural unit of $-(CF_2O)_m-$.

4. The magnetic recording medium according to claim 1, wherein said lubricant is a perfluoropolyether lubricant having a number average molecular weight of 800 to 30,000 and represented by formula (I):

$$CF_3O-(CF_2O)_m-(CF_2CF_2O)_n-CF_3 \quad (I)$$

wherein m represents an integer of 2 or greater; n represents an integer of 1 or greater; and 7>m/n>2.

5. The magnetic recording medium according to claim 1, wherein said protective layer additionally comprises at least one of silicon carbide, boron carbide, tungsten carbide, k silicon oxide, zirconium oxide, silicon nitride, and boron nitride.

* * * * *